United States Patent
Sato et al.

(10) Patent No.: US 8,213,778 B2
(45) Date of Patent: Jul. 3, 2012

(54) RECORDING DEVICE, REPRODUCING DEVICE, RECORDING MEDIUM, RECORDING METHOD, AND LSI

(75) Inventors: Yasunori Sato, Hyogo (JP); Kazuhiko Hirayama, Osaka (JP); Akihiro Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 1322 days.

(21) Appl. No.: 11/886,453

(22) PCT Filed: Mar. 17, 2006

(86) PCT No.: PCT/JP2006/305414
§ 371 (c)(1),
(2), (4) Date: Sep. 17, 2007

(87) PCT Pub. No.: WO2006/101053
PCT Pub. Date: Sep. 28, 2006

(65) Prior Publication Data
US 2009/0052867 A1    Feb. 26, 2009

(30) Foreign Application Priority Data
Mar. 22, 2005 (JP) .................... 2005-082327

(51) Int. Cl.
H04N 5/92 (2006.01)
H04N 5/917 (2006.01)
H04N 5/84 (2006.01)
H04N 5/89 (2006.01)

(52) U.S. Cl. ........ 386/326; 386/330; 386/331; 386/332; 386/334

(58) Field of Classification Search .............. None
See application file for complete search history.

(56) References Cited

U.S. PATENT DOCUMENTS

| | | |
|---|---|---|
| 6,445,877 B1 | 9/2002 | Okada et al. |
| 6,628,890 B1 | 9/2003 | Yamamoto et al. |
| 2003/0059196 A1 | 3/2003 | Ando et al. |
| 2003/0081939 A1 | 5/2003 | Kim et al. |

(Continued)

FOREIGN PATENT DOCUMENTS

EP   1 309 195   5/2003

(Continued)

OTHER PUBLICATIONS

Supplementary European Search Report issued Feb. 5, 2010 in EP 06 72 9403.

(Continued)

Primary Examiner — William C Vaughn, Jr.
Assistant Examiner — Asher Khan
(74) Attorney, Agent, or Firm — Wenderoth, Lind & Ponack, L.L.P.

(57) ABSTRACT

Provided is a recording apparatus generating meta-information including an initial address of TS packets constituting a PES packet that includes an independently-decodable picture, and including size information pertaining to the picture, and recording the generated meta-information in a recording medium. The recording apparatus includes a detection unit detecting, from the TS packets constituting a transport stream, a TS packet at a head of a PES packet, and includes a judging unit judging whether the PES packet includes an independently-decodable picture. Further, the recording apparatus includes generation unit generating meta-information including, as the size information, a size from a head of a PES packet that is judged as including an independently-decodable picture to a head of a succeeding PES packet.

4 Claims, 17 Drawing Sheets

U.S. PATENT DOCUMENTS

| | | |
|---|---|---|
| 2004/0027890 A1 | 2/2004 | Nakanishi et al. |
| 2004/0047612 A1* | 3/2004 | Nagata et al. .................. 386/98 |
| 2004/0141731 A1 | 7/2004 | Ishioka et al. |
| 2009/0087169 A1 | 4/2009 | Nakanishi et al. |

FOREIGN PATENT DOCUMENTS

| | | |
|---|---|---|
| JP | 2000-217066 | 8/2000 |
| JP | 2000-224543 | 8/2000 |
| JP | 2003-108194 | 4/2003 |
| JP | 2003163890 A * | 6/2003 |
| JP | 2004-180282 | 6/2004 |
| JP | 2004-221918 | 8/2004 |
| JP | 2004-320787 | 11/2004 |

OTHER PUBLICATIONS

International Search Report of International Application PCT/JP2006/305414 dated Jun. 20, 2006.

PCT/IPEA/409 of International Application PCT/JP2006/305414 dated Apr. 13, 2007.

* cited by examiner

FIG. 13

| EntryPESPacketNum[0]=14 | EntryPESPacketNum[1]=7 | · · · |
|---|---|---|
| TPI[0]=0 | TPI[1]=25 | · · · |

RECORDING DEVICE, REPRODUCING DEVICE, RECORDING MEDIUM, RECORDING METHOD, AND LSI

TECHNICAL FIELD

The present invention relates to a meta-information generation technique.

BACKGROUND ART

Meta-information is information used for reading video streams, and indicates the address and the size of each piece of picture data that is independently decodable. In MPEG2 (Moving Picture Experts Group phase 2), MPEG4-AVC (Advanced Video Coding,) and so on, meta-information generation technique is indispensable for particular kinds of playback operation for playing back video streams that have been encoded using correlation among frames. Accordingly, the meta-information generation technique is adopted in the application layer standard of various recording media.

Since video streams encoded in accordance with an encoding method such as the MPEG2-Video and the MPEG4-AVC are compressed using the correlation among the frames, it is impossible to decode a P picture and a B picture until a picture data that is independently decodable is decoded. Therefore, a playback apparatus reads meta-information to interpret how much data should be read and from which position the data should be read. As a result, the playback apparatus can immediately judge where to start reading of the video stream to play back the independently-decodable picture data, without actually analyzing the content of the video stream. In this way, it is possible to read independently-decodable pictures one by one by using the meta-information without reading unnecessary data. As a result, in the case where video data is recorded in a recording medium, random access such as fast-forward playback and reverse playback can be appropriately realized.

Note that Japanese Laid-open Patent Application Publication No. 2000-224543 discloses a prior art relating to the meta-information generation technique.

DISCLOSURE OF THE INVENTION

Problem to Be Solved by the Invention

Meanwhile, when performing random access on a recording medium, address information that shows the position of the head of picture data as a "point" is not enough for a playback apparatus to read independently-decodable picture data. For this purpose, size information, showing the size of the picture data included in the video stream, is required.

In the case of encoding, a DVD recording apparatus generates the size information by representing picture data size in units of bytes. Also, in the case of receiving and writing an already-encoded TS (Transport Stream) into a recording medium, the size information of the picture data can be obtained by expanding the TS to a PES (Packetized Elementary Stream). Such an expansion of a TS is required because the recording apparatus can find the end of picture data only by detecting a picture header of the next picture data, and can not detect the end of picture data without expanding the TS to a PES.

However, since expansion to a PES requires hardware sources such as a memory, it is impossible to meet the demand for further simplification of the recording apparatus. Moreover, since the recording apparatus is required to search a PES bit by bit for a picture header, the processing load becomes large. Therefore, it is difficult to apply this method to a portable receiver for digital TV broadcasting. This is the problem.

The present invention is made in view of the problem above. The object of the present invention is to provide a recording apparatus that generates meta-information by generating size information showing a size of picture data that is independently decodable without being expanded to a PES.

Means for Solving the Problem

To solve the above-describe problem, the present invention provides a recording apparatus that generates meta-information that includes an initial address of TS packets constituting a PES packet that includes an independently-decodable picture, and size information pertaining to the picture, and records the generated meta-information in a recording medium, comprising: a detection unit operable to detect, from the TS packets constituting a transport stream, a TS packet at a head of a PES packet; a judging unit operable to judge whether the PES packet includes an independently-decodable picture; and a generation unit operable to generate meta-information that includes, as the size information, a size from a head of a PES packet that is judged as including an independently-decodable picture to a head of a succeeding PES packet.

Advantageous Effects of the Present Invention

Reference to TS packets makes it possible to detect the head of a PES packet from TS packets constituting a TS and to judge whether or not the PES packet includes an independently-decodable picture, and it is unnecessary to expand a TS to a PES for this purpose.

Also, the size of the independently-decodable picture is approximated by using the number of TS packets that exist between the head of the PES packet that includes the independently-decodable picture and the head of the next PES packet. Therefore, although the accuracy of the data size is not very high, the load of processing to be performed by the recording apparatus at the reception is far lower than stationary recording apparatuses such as a DVD recording apparatus. As a result, it is possible to greatly reduce the processing load for generating the meta-information. This contributes markedly to development of portable recording apparatuses.

Here, the size information may be represented by the number of TS packets that exist between the head of the PES packet that is judged as including the independently-decodable picture and the head of the succeeding PES packet.

Here, the detection unit may further detect the size information of the PES packet from the TS packet, and the number of TS packets may correspond to the size information.

With the stated structure, the end of the PES packet is judged using the size information of the PES packet. Therefore, even if the head of the PES packet that should exist next lacks for example, the approximation is performed based on the number of TS packets corresponding to the size information of the PES packet, instead of using all the TS packets existing between the head of the PES packet and the head of the PES packet that follows the missing PES packet. As a result, it is possible to improve the accuracy of the data size.

Here, the detection unit may further detect playback time information showing the playback time of the picture from the TS packet, and reference clock information used for synchronization between video data and audio data from any of TS packets that follow the TS packet, the generation unit may further include a time information judging subunit operable to judge whether a value of the reference clock information is equal to or more than a value of the playback time information, and the size information may be represented by the number of TS packets that exist between the head of the PES packet that is judged including the independently-decodable picture and a TS packet as to which the time information judging subunit judges affirmatively.

With the stated structure, if it is judged that the value of the reference clock information is equal to or more than the value of the playback time information, the picture size is approximated by using the number of TS packets counted from the head of the PES packet that has been judged as including the independently-decodable picture until the judgement. As a result, it is possible to improve the accuracy of the data size.

BRIEF DESCRIPTION OF THE DRAWINGS

FIG. 13 shows a TSE_INFO5 table of a case shown in FIG. 12.

EXPLANATION OF REFERENCES

Figure 1:
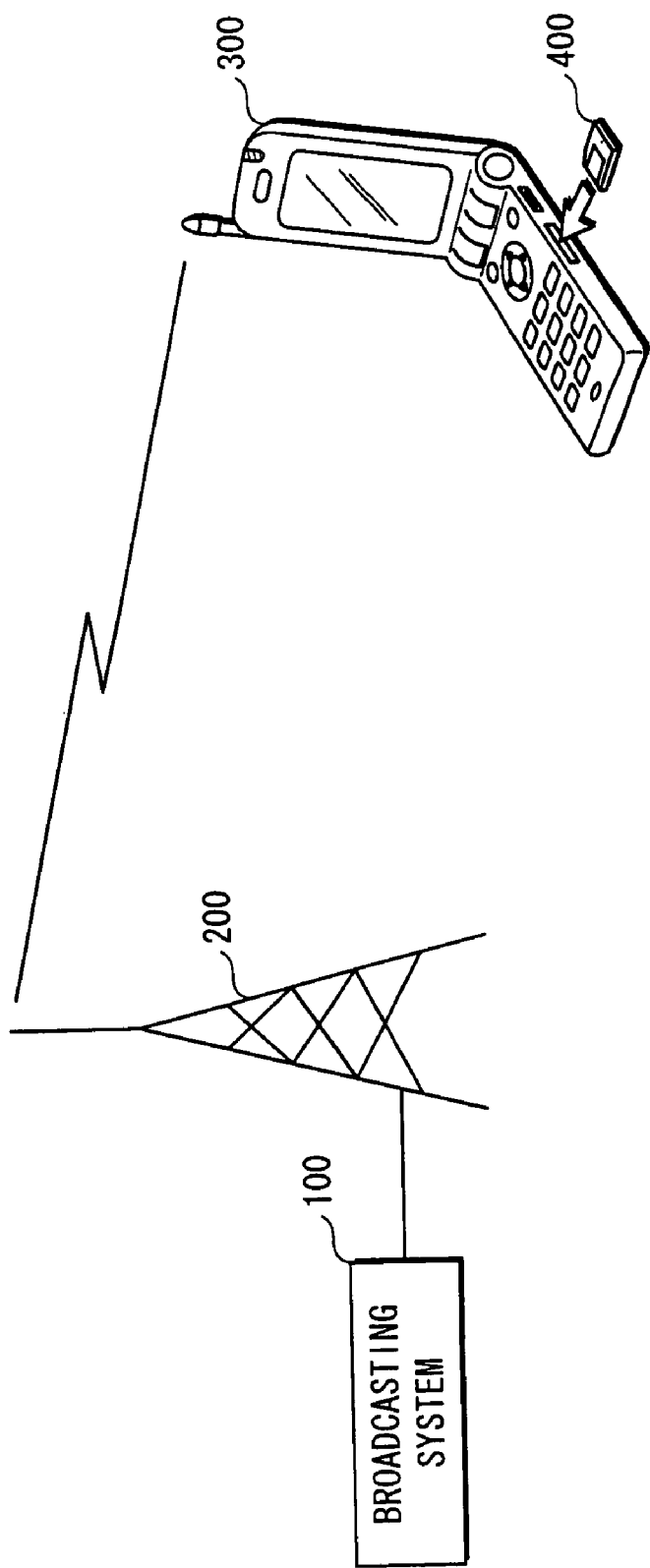
FIG. 1 is a system diagram pertaining to the present invention.

100 Broadcasting system
200 Transmission antenna
300 Recording/playback apparatus
310 UI unit
320 System control unit
330 Meta-information generation unit
331 TS packet analysis unit
331a TS packet analysis unit
331b TS packet analysis unit
331c TS packet analysis unit
332 TPI holding unit
333 TS packet counting unit
334 Meta-information storage unit
335 Meta-information generation control unit
340 Input unit
350 Information recording medium control unit
360 Decoding unit
370 Output unit
400 Information recording medium

BEST MODE FOR CARRYING OUT THE INVENTION

The following describes embodiments of the present invention.

First Embodiment
<Overview of System>

The following describe an embodiment of a recording/playback apparatus 300 pertaining to the present invention. First of all, among various acts of practicing the recording/playback apparatus pertaining to the present invention, an act of using is described. The recording/playback apparatus 300 pertaining to the present invention is used by a user in a form of a system shown in FIG. 1. The system shown in FIG. 1 includes a broadcasting system 100, a transmission antenna 200, the recording/playback apparatus 300, and an information recording medium 400.

The broadcasting system 100 is a system for generating stream data to be transmitted by digital broadcasting. The stream data to be generated is an MPEG2 transport stream of the ISO/IEC 13818-1 defined for digital broadcasting in accordance with the standard relating to the C profile of the "operational guidelines for digital terrestrial television broadcasting" (ARIB TR B-14) or a standard relating to the ARIB TR B-14. Video data, audio data and so on are multiplexed into the MPEG2 transport stream. The video data to be multiplexed is, for example, video data defined in the MPEG4-AVC standard (ISO/IEC14496-10). The audio data to be multiplexed is, for example, audio data defined in the MPEG2-AAC standard (ISO/IEC13818-7).

The transmission antenna 200 transmits a digital broadcast wave. The stream data generated by the broadcasting system 100 is transmitted via the transmission antenna 200.

The recording/playback apparatus 300 includes an antenna unit, a display unit and so on. The recording/playback apparatus 300 receives the stream data by the antenna unit, and generates meta-information of the received stream data. Then, the recording/playback apparatus 300 records the received stream data and the meta-information of the stream data into the information recording medium 400. The recording/playback apparatus 300 also acquires, based on the meta-information, stream data recorded in the information recording medium 400, and displays the stream data on the display unit.

The information recording medium 400 is a recording medium for recording data therein, and specifically is an optical disc, a magnetic disc, a semiconductor memory or the like. The recording/playback apparatus 300 pertaining to the present invention records stream data and meta-information of the stream data into the information recording medium 400. Note that explanations in the following embodiments are based on an assumption that the information recording medium 400 is an SD card.

This concludes the explanation of the act of using of the recording/playback apparatus 300.

Next, an embodiment of the recording/playback apparatus 300 pertaining to the present invention is explained with reference to the drawings.

<Structure>

Figure 2:
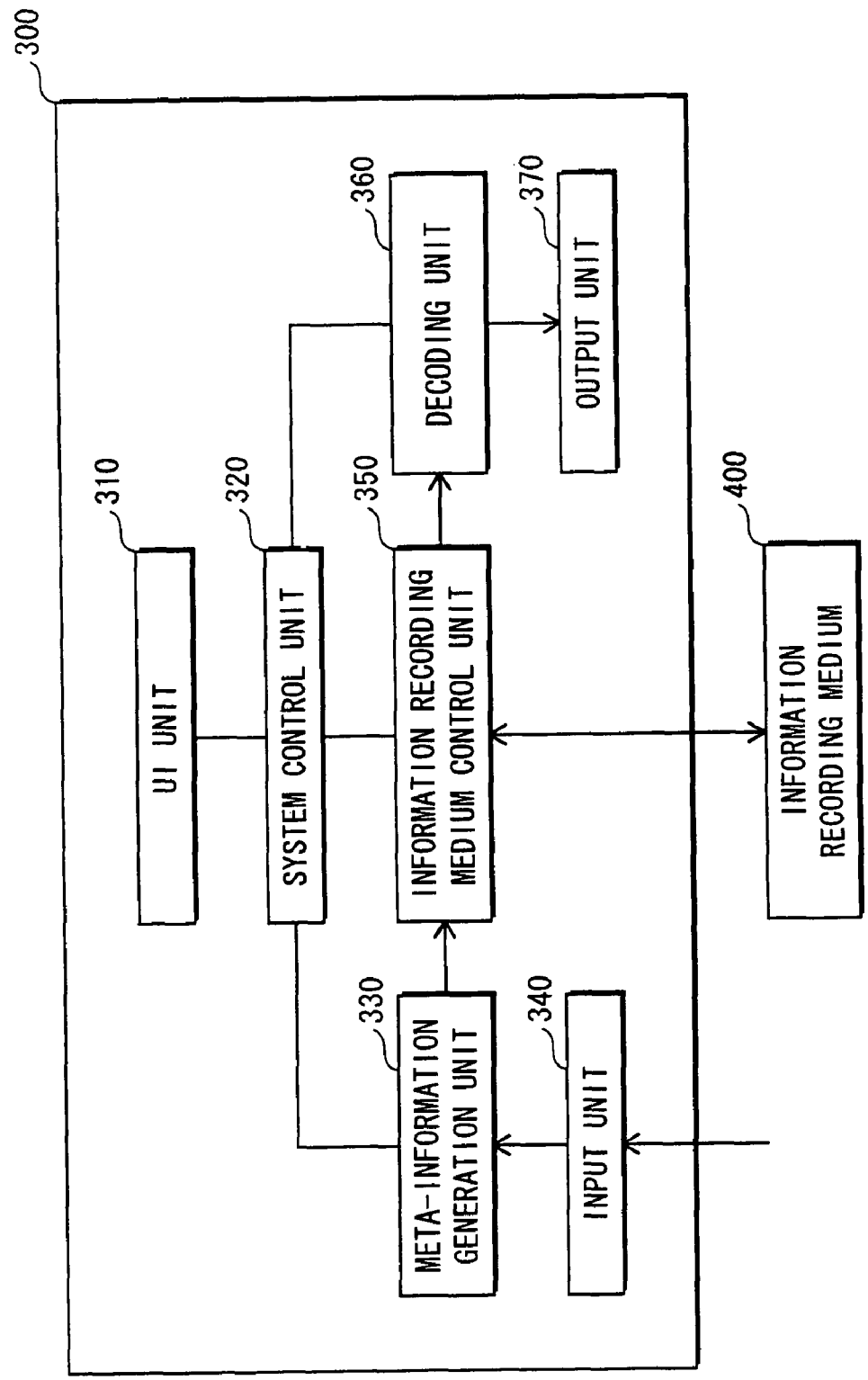
FIG. 2 is a functional block diagram showing the structure of a recording/playback apparatus of the first embodiment.

FIG. 2 is a functional block diagram showing the structure of the recording/playback apparatus 300 in accordance with the first embodiment. The recording/playback apparatus 300 includes a UI (User Interface) unit 310, a system control unit 320, a meta-information generation unit 330, an input unit 340, an information recording medium control unit 350, a decoding unit 360 and an output unit 370.

The recording/playback apparatus 300 is, specifically, a computer system structured from a microprocessor, a ROM, a RAM, a hard disk unit and so on. The ROM or the hard disk unit stores therein a computer program. The functions of the recording/playback apparatus 300 are achieved by the microprocessor operating in accordance with the computer program.

The UI unit 310 receives user's operations, and instructs the system control unit 320 based on the operations (i.e. recording, playback, and so on).

The system control unit 320 controls the meta-information generation unit 330, the information recording medium control unit 350 and the decoding unit 360 in accordance with instructions received from the UI unit 310.

Figure 3:
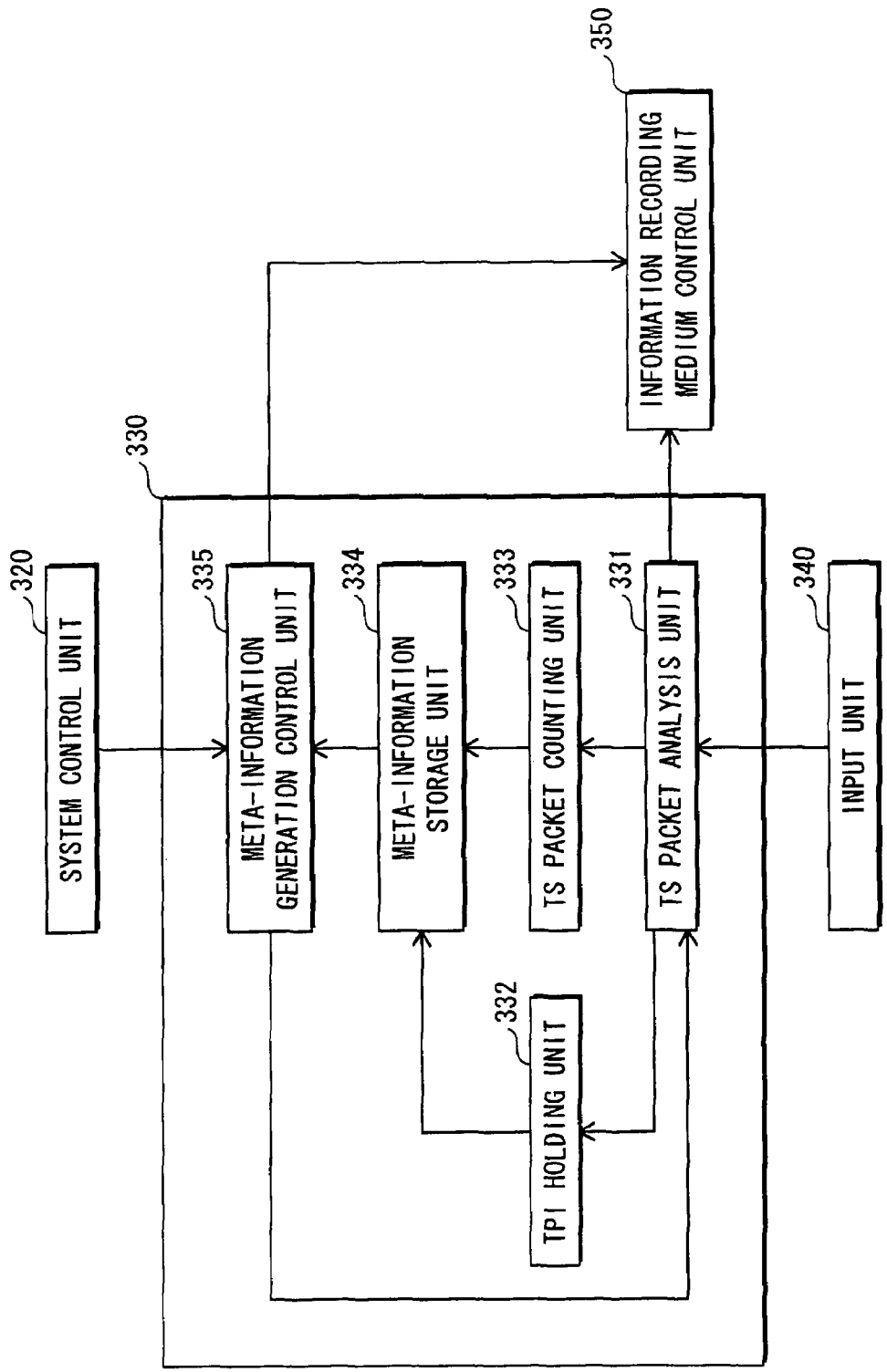
FIG. 3 is a functional block diagram showing details of the structure of a meta-information generation unit 330.

Upon receiving an instruction for recording from the system control unit 320, the meta-information generation unit 330 acquires stream data from the input unit 340, and generates meta-information. The meta-information generation unit 330 outputs the stream data and the generated meta-information to the information recording medium control unit 350. As FIG. 3 shows, the meta-information generation unit 330 includes, specifically, a TS packet analysis unit 331, a TPI holding unit 332, a TS packet counting unit 333, a meta-information storage unit 334 and a meta-information generation control unit 335.

The TS packet analysis unit 331 sequentially acquires TS packets from the input unit 340, and judges whether an acquired TS packet includes a PES header of a video, based on the PID and the payload_unit_start_indicator. If judging that the TS packet includes a PES header of a video, the TS packet analysis unit 331 further judges whether the TS packet includes an IDR picture, based on the primary_pic_type. If judging that the TS packet includes an IDR picture, the TS packet analysis unit 331 outputs a number that has been given to the TS packet to the TPI holding unit 332.

The TPI holding unit 332 holds a number that has been given to a TS packet that is judged by the TS packet analysis unit 331 as including an IDR picture.

The TS packet counting unit 333 increments the count of the TS packets 1 by 1 in accordance with the judgment by the TS packet analysis unit 331. Specifically, the TS packet counting unit 333 firstly increments the count of TS packets by 1 when the TS packet analysis unit 331 judges that a received TS packet includes an IDR picture. Then, the TS packet counting unit 333 increments the count at every reception of a TS packet until the TS packet analysis unit 331 judges that a received TS packet includes a PES header of a video.

The meta-information storage unit 334 stores meta-information that associates the number that has been given to the TS packet and held by the TPI holding unit 332 with the count of the TS packets counted by the TS packet counting unit 333. Here, the meta-information is data that includes the structure and management information of the stream data. According to the present invention, information that helps the recording/playback apparatus 300 to perform the high-speed playback of the stream data is generated as the meta-information.

The meta-information generation control unit 335 controls the TS packet analysis unit 331 in accordance with an instruction from the system control unit 320. Also, the meta-information generation control unit 335 outputs meta-information stored in the meta-information storage unit 334 to the information recording medium control unit 350, in accordance with an instruction from the system control unit 320.

The input unit 340 receives stream data transmitted as a digital broadcast wave. The input unit 340 also gives a number to each of TS packets included in the received stream data. A number "0" is given to the TS packet at the head of the content, and sequential numbers are given to the following TS packets. The input unit 340 includes, specifically, an antenna, a TV signal input unit, and so on.

The information recording medium control unit 350 controls recording of stream data and meta-information into the information recording medium 400, acquisition of stream data and meta-information from the information recording medium 400, and soon. Upon receiving an instruction for recording from the system control unit 320, the information recording medium control unit 350 records the stream data output from the meta-information generation unit 330 and the meta-information of the stream data into the information recording medium 400.

Upon receiving an instruction for playback from the system control unit 320, the information recording medium control unit 350 acquires meta-information recorded in the information recording medium 400, and outputs the meta-information to the decoding unit 360. Then, the information recording medium control unit 350 acquires part of stream data in accordance with a request from the decoding unit 360, and outputs the acquired data to the decoding unit 360.

Upon receiving an instruction for playback from the system control unit 320, the decoding unit 360 receives meta-information of stream data from the information recording medium control unit 350. Then, based on the meta-information, the decoding unit 360 requests the information recording medium control unit 350 to acquire part of stream data that corresponds to the PES packet the includes an IDR picture. Upon receiving the requested stream data, the decoding unit 360 decodes the IDR picture included in the received stream data. In general, the decoding unit 360 further decodes audio data. After decoding the stream data, the decoding unit 360 outputs a video signal, an audio signal and so on that have been generated by the decoding, to the output unit 370. Here, the video signal and the audio signal resultant from the decoding are non-compressed digital data.

The output unit 370 plays back the signals received from the decoding unit 360. The output unit 370 specifically includes a video display unit such as an LCD, and an audio playback unit such as a speaker.

This concludes the explanation of the structure of the recording/playback apparatus 300.

<Structure of TS Packet>

The structure of a TS packet is explained next.

Figure 4:
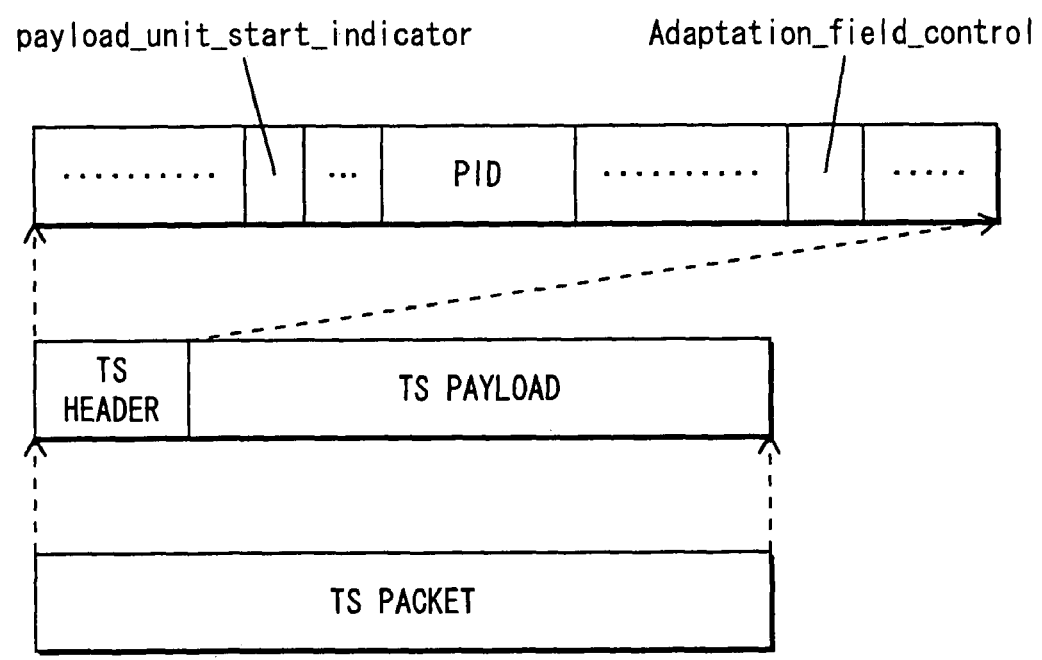
FIG. 4 shows the structure of a TS packet.

A stream data is structured from TS packets. FIG. 4 shows the structure of a TS packet. A TS packet includes a TS header and a payload. The TS header includes a payload_unit_start_indicator, a PID, and an Adaptation_field_control.

The payload_unit_start_indicator shows whether the TS packet includes the head of a PES packet or not (i.e. whether the payload includes a PES packet header or not).

The PID shows a type of the TS packet. Specifically, the PID shows which between video data or audio data the payload includes.

The Adaptation_field_control shows whether one of the Adaptation_field and the payload exists, or both of them exist. If the Adaptation_field exists, the Adaptation_field includes an Adaptation_field_length.

The Adaptation_field_length shows a size of the Adaptation_field.

The payload includes video data or audio data.

Figure 5:
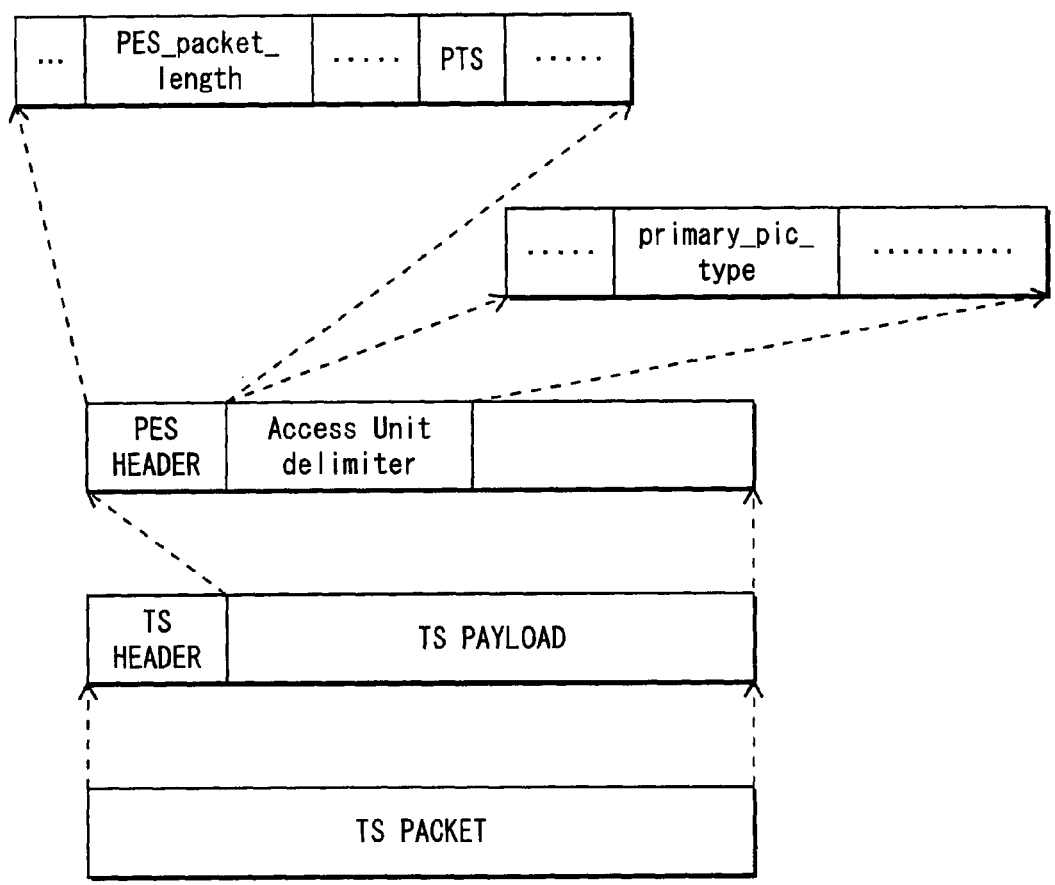
FIG. 5 shows the structure of a TS packet that includes the head of a PES packet of video data in a payload thereof.

Next, FIG. 5 shows the structure of a TS packet of the case where the head of a PES packet of video data is included in the payload. As FIG. 5 shows, the payload includes a PES packet. The PES packet includes a PES header and an ES (Elementary Stream).

The PES header includes a PES_packet_length and a PTS (Presentation Time Stamp).

The PES_packet length shows a size of the PES packet.

The PTS shows a playback time of picture data that immediately follows the PES header.

The PES packet of video data included in stream data that is in conformity with the C profile of the ARIB TR B-14 includes an integral number of pieces (one or more pieces) of picture data. Therefore, picture data follows the PES header of the PES packet of the video data, and in general, it is an Access Unit delimeter of the picture data that follows the PES header. The Access Unit delimeter includes a primary_pic_type.

The primary_pic_type is information for identifying a type of picture data (an IDR picture or a picture other than IDR picture) The IDR picture shows that pictures that follow the IDR picture can be properly decoded without using any pictures that are precedent to the IDR picture.

Note that in the PES of video data included in a stream data that is in conformity with the C profile of the ARIB TR B-14, the IDR picture is necessarily located at the head of the PES packet.

<Meta-Information>

Figure 6:
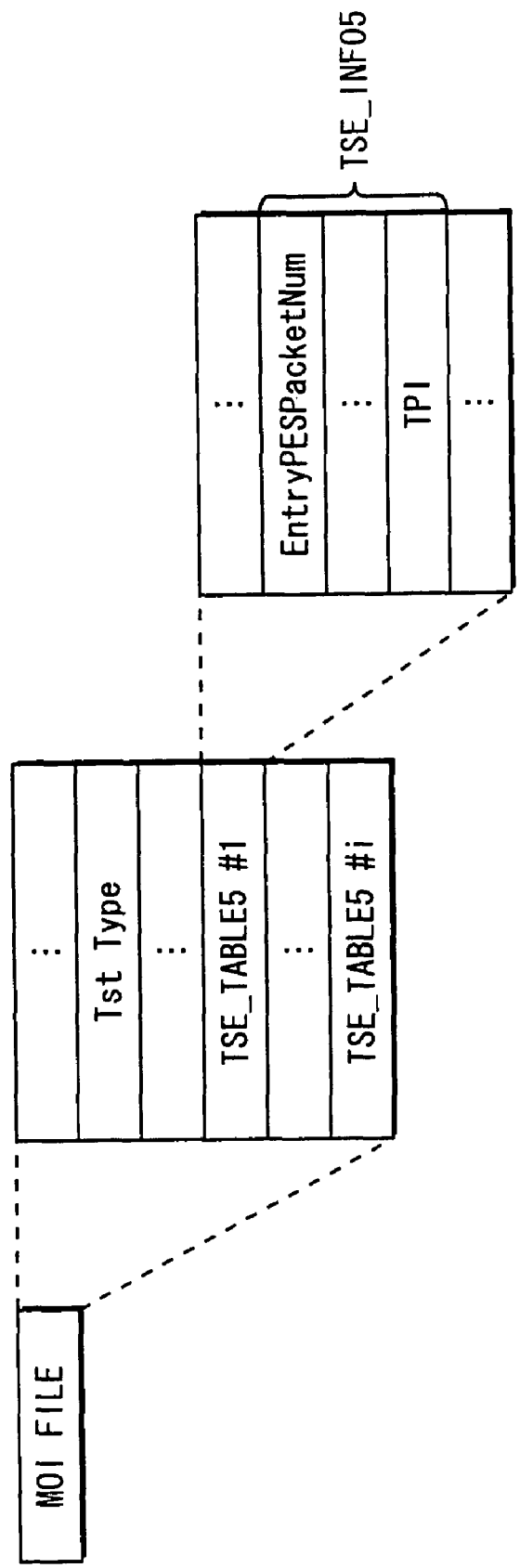
FIG. 6 shows the structure of meta-information.

Next, FIG. 6 shows the structure of meta-information. A MOI (Media Object Information) file is a file in which meta-information is described. The MOI file includes a TstType and a TSE_TABLE5.

The TstType shows whether or not the MOI file is a file showing the meta_information pertaining to the present invention.

The TSE_TABLE5 includes a TSE_INFO5. The TSE_INFO5 includes an EntryPESPacketNum and a TPI (Transport Packet Index). The number of the TSE_INFO5s to be generated by the meta_information generation unit 330 is the same as the number of the IDR pictures.

The EntryPESPacketNum shows the number of TS packets required for acquiring the whole PES packet including an IDR picture.

The TPI shows a number given to a TS packet that includes the first byte of the IDR picture, among TS packets included in the PES packet that includes the IDR picture.

Figure 7:
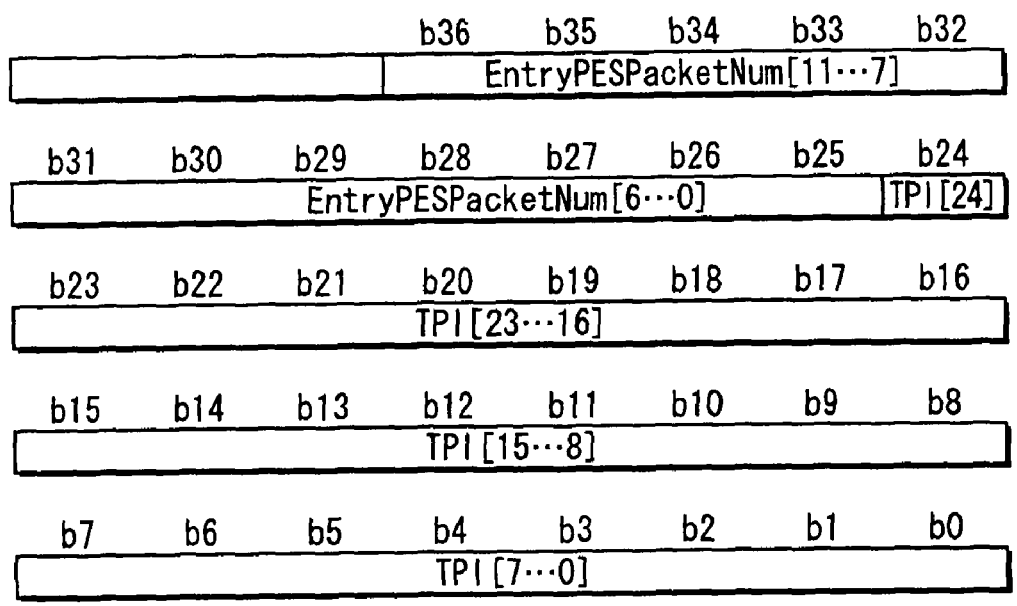
FIG. 7 shows a bit sequence of meta-information.

Next, FIG. 7 shows an example of a bit sequence of the TSE_INFO5 table pertaining to the present invention. The EntryPESPacket Num and the TPI shown in FIG. 6 are recorded into the information recording medium 400 as the bit sequence shown in FIG. 7. The recording/playback apparatus 300 can read and write the TSE_INFO5 table pertaining to the present invention.

<Recording Processing>

Figure 8:
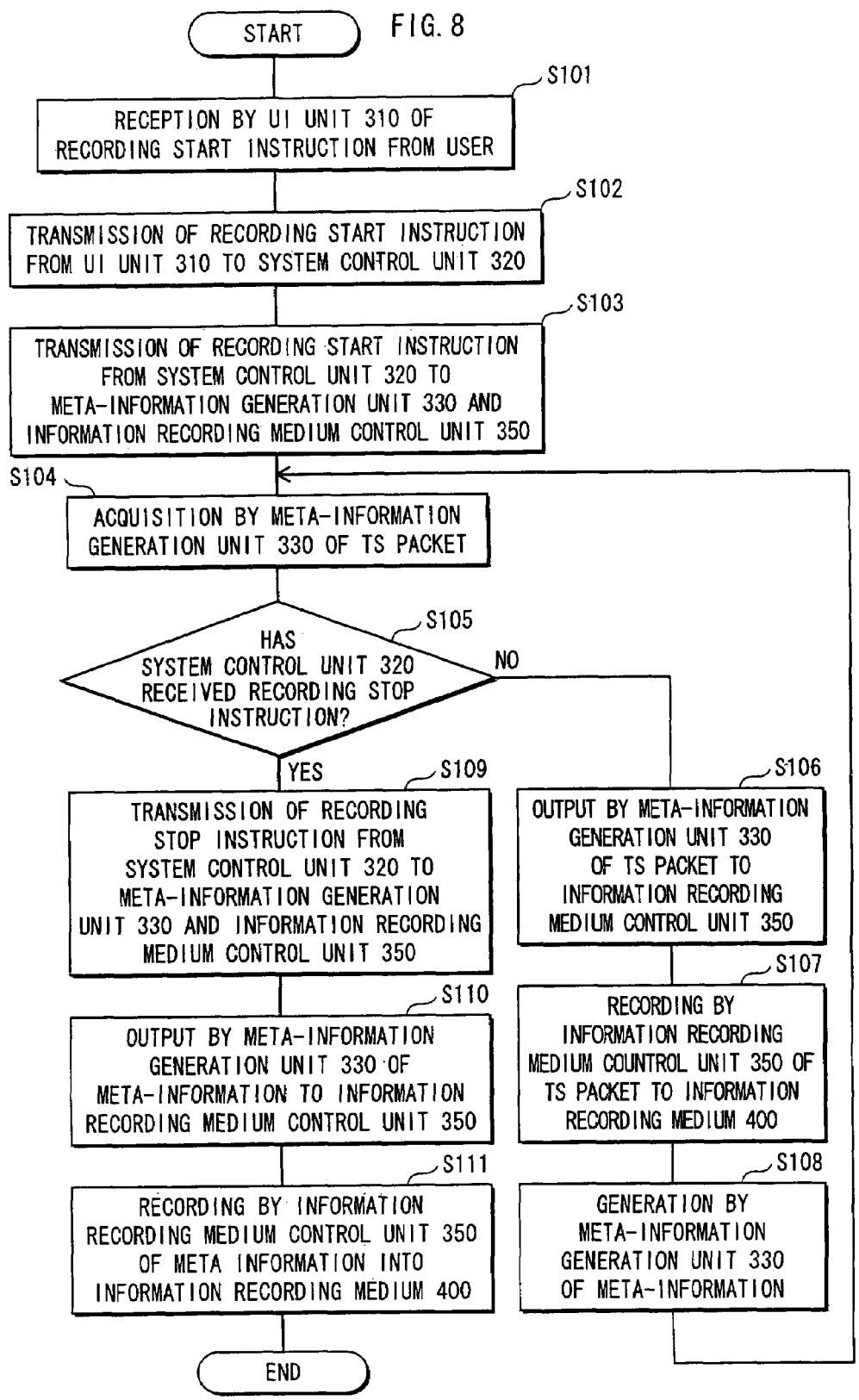
FIG. 8 is a flowchart showing recording processing.

Next, recording processing performed by the recording/playback apparatus 300 is explained with reference to a flowchart shown in FIG. 8.

Firstly, upon receiving an instruction for starting recording from the user (Step S101), the UI unit 310 instructs the system control unit 320 to start recording (Step S102). The system control unit 320 instructs the meta-information generation unit 330 and the information recording medium control unit 350 to start recording (Step S103). Upon receiving the recording start instruction, after finishing initialization processing, the meta-information generation unit 330 acquires stream data from the input unit 340 (Step S104). The meta-information generation unit 330 acquires pieces of the stream data such as a TS packet, each having a prescribed size. The system control unit 320 judges whether the system control unit 320 has received an instruction for stopping recording from the UI unit 310 or the information recording medium control unit 350 (Step S105). If the system control unit 320 has received the recording stop instruction, the recording/playback apparatus 300 performs recording stop processing (Steps S109 to S111). Here, if the UI unit 310 has a received an instruction for stopping recording from the user, the UI unit 310 instructs the system control unit 320 to stop recording, and the information recording medium control unit 350 instructs the system control unit 320 to stop recording when the remaining recording space in the information recording medium 400 becomes small. If the UI unit 310 has not received such an instruction, the recording processing is to be continued.

In the case of continuing the recording processing, the meta-information generation unit 330 and the information recording medium control unit 350 continues execution of Steps S106, S107, S108 and S104. In other words, the meta-information generation unit 330 outputs the stream data acquired in Step S104 to the information recording medium control unit 350 (Step S106). Upon receiving the stream data, the information recording medium control unit 350 records the stream data into the information recording medium 400 (Step S107). At the same time, the meta-information generation unit 330 generates meta-information from the acquired stream data if necessary (Step S108), and acquires another piece of stream data (Step S104).

In recording finish processing. (Steps S109 to S111), the recording/playback apparatus 300 records the meta-information into the information recording medium 400. In other words, the system control unit 320 instructs the meta-information generation unit 330 and the information recording medium control unit 350 to stop recording (Step S109). Upon receiving the instruction, the meta-information generation unit 330 outputs the meta-information of the recorded stream data to the information recording medium control unit 350 (Step S110). The information recording medium control unit 350 receives the output meta-information, and records the meta-information into the information recording medium 400 (Step S111).

This concludes the explanation of the recording processing performed by the recording/playback apparatus 300.

<Meta-Information Generation Processing>

Figure 9:
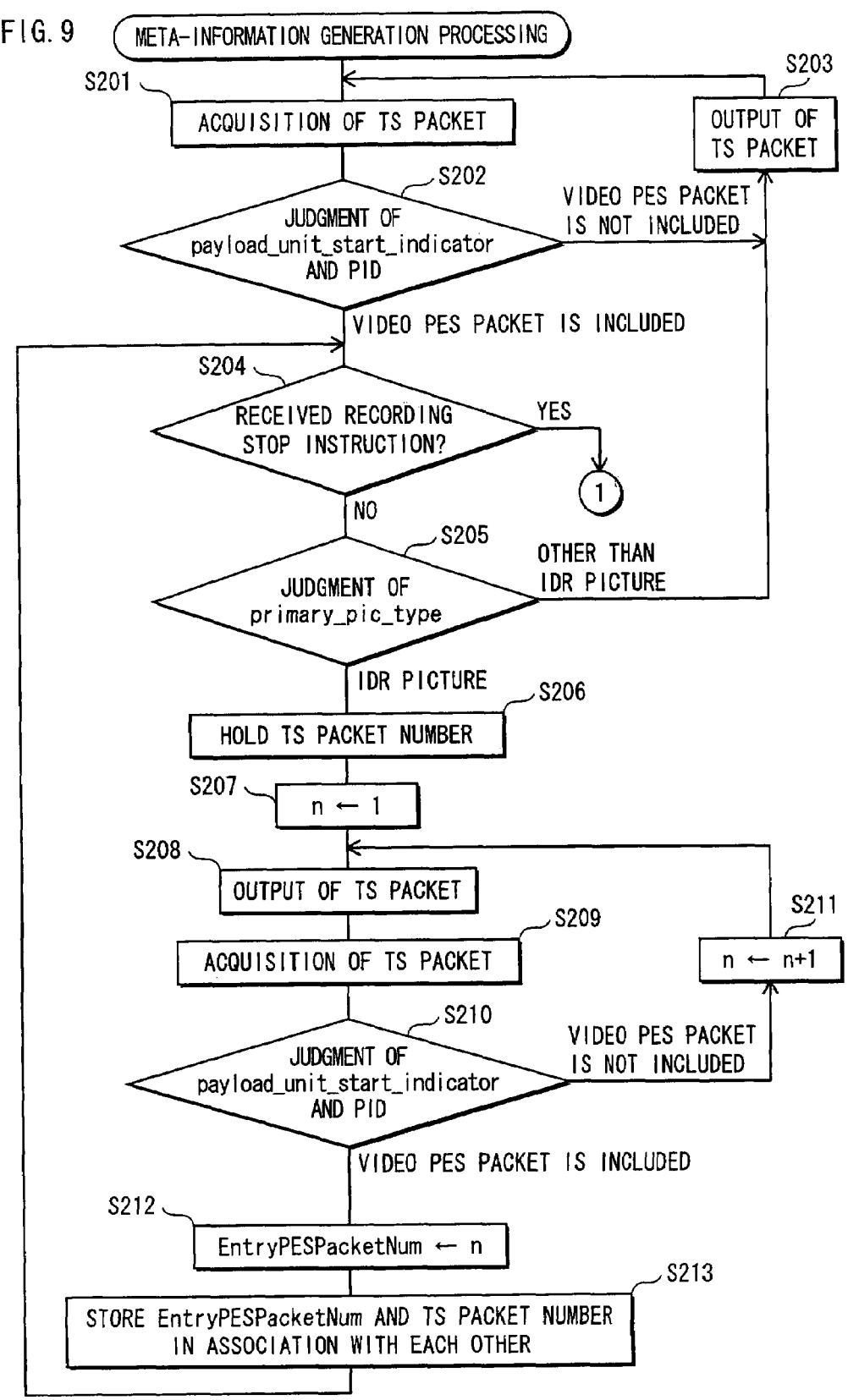
FIG. 9 is a flowchart showing meta-information generation processing.
Figure 10:
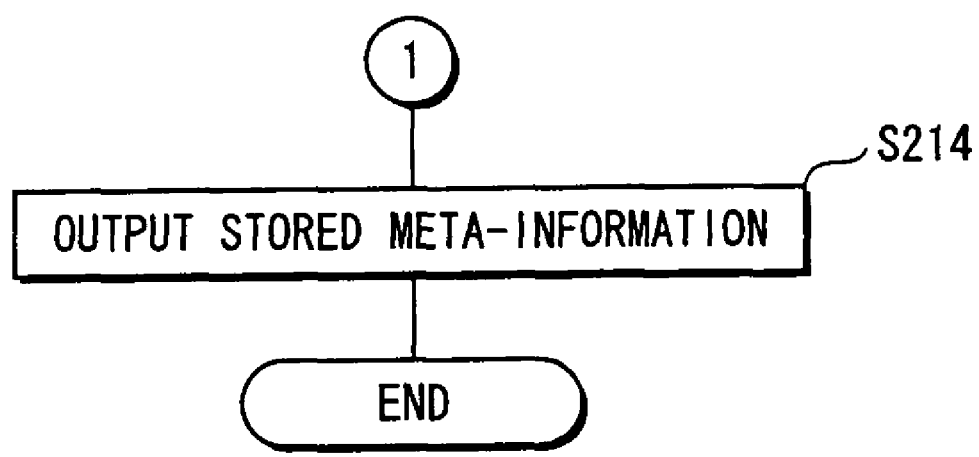
FIG. 10 is a flowchart showing meta-information generation processing.

Next, meta-information generation processing performed by the meta-information generation unit 330 is explained with reference to flowcharts shown in FIG. 9 and FIG. 10.

In the flowcharts, "n" is a variable that specifies the number of TS packets. Firstly, upon receiving an instruction for starting recording from the meta-information generation control unit 335, the TS packet analysis unit 331 acquires a TS packet from the input unit 340 (Step S201). The TS packet analysis unit 331 refers to the payload_unit_start_indicator and the PID included in the TS header of the TS packet, and judges whether the payload includes the PES packet header of video data (Step S202). If the TS packet analysis unit 331 judges negatively, the TS packet analysis unit 331 outputs the TS packet to the information recording medium 400 (Step S203), and executes Step S201.

If the TS packet analysis unit 331 judges that the payload includes the PES packet header, the meta-information generation control unit 335 judges whether an instruction for stopping recording has been transmitted from the system control unit 320 during execution of the Steps S201 to S203 (Step S204). If the meta-information control unit 335 judges negatively, the TS packet analysis unit 331 refers to the primary_pic_type, and judges whether the PES packet including the TS packet includes an IDR picture (Step S205). If the TS packet analysis unit 331 judges negatively, Step S203 is to be executed.

In other words, the TS packet analysis unit 331 continues acquiring TS packets until the TS packet analysis unit 331 acquires a TS packet constituting a PES packet that includes an IDR picture, and a payload that includes the PES packet header of video data (Steps S201 to S205).

If the TS packet analysis unit 331 judges that the PES packet includes an IDR picture, the TPI holding unit 332 holds a number given to the TS packet (Step S206). The TS packet analysis unit 331 sets 1 to n (Step S207). The TS packet analysis unit 331 outputs the TS packet to the information recording medium 400 (Step S208), and acquires another TS packet from the input unit 340 (Step S209). The TS packet analysis unit 331 refers to the payload_unit_start_indicator and the PID, and judges whether the payload includes the PES packet header of video data (Step S210). If judging negatively, the TS packet analysis unit 331 increments n by 1 (Step S211), and then Step S208 is to be performed. If judging affirmatively, the TS packet analysis unit 331 sets n to the EntryPESPacketNum (Step S212). The EntryPESPacketNum is information showing the size of a picture that is independently decodable. The meta-information storage unit 334 stores meta-information in which the number of TS packets (TPI) held by the TPI holding unit 332 and the EntryPESPacketNum are associated with each other (Step S213). Then, Step S204 is to be executed.

In Step S204, if the instruction for stopping recording has been transmitted, the meta-information generation control unit 335 outputs the meta-information stored in the meta-information storage unit 334 to the information recording medium control unit 350 (Step S214).

This concludes the explanation of the meta-information generation processing performed by the meta-information generation unit 330.

<High-Speed Playback Processing>

Figure 11:
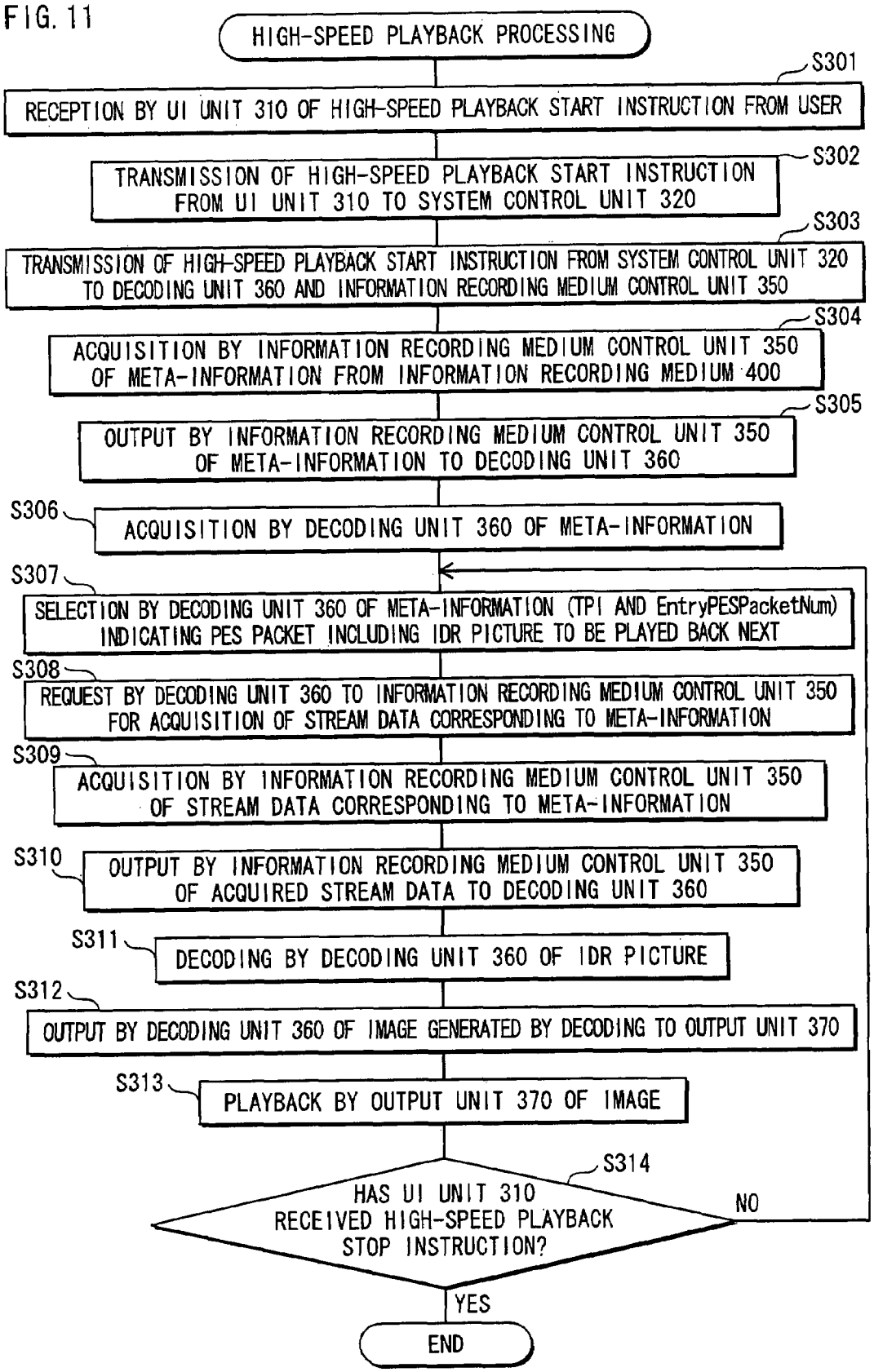
FIG. 11 is a flowchart showing high-speed playback processing.

Next, high-speed playback processing performed by the recording/playback apparatus 300 is explained with reference to a flowchart shown in FIG. 11.

Firstly, upon receiving an instruction for starting high-speed playback from the user (Step S301), the UI unit 310 instructs the system control unit 320 to start high-speed playback (Step S302). The system control unit 320 instructs the decoding unit 360 and the information recording medium control unit 350 to start high-speed playback (Step S303). Upon receiving the instruction, the information recording medium control unit 350 acquires the meta-information from the information recording medium 400 (Step S304), and outputs the acquired meta-information to the decoding unit 360 (Step S305). Upon acquiring the meta-information (Step S306), the decoding unit 360 selects pieces of meta-information (i.e. the TPI and the EntryPESPacketNum) that indicate the PES packet that includes an IDR picture to be played back next (Step S307). Then, the decoding unit 360 requests the information recording medium control unit 350 to acquire stream data that corresponds to the selected meta-information (Step S308) Upon receiving the request, the information recording medium control unit 350 acquires the stream data corresponding to the meta-information (Step S309), and outputs the acquired stream data to the decoding unit 360 (Step S310). Upon receiving the stream data, the decoding unit 360 decodes the IDR picture included in the received stream data (Step S311). Then, the decoding unit 360 transmits a picture generated by the decoding to the output unit 370 (Step S312). The output unit 370 displays the received picture (Step S313). After that, the UI unit 310 judges whether an instruction for stopping the high-speed playback has been received while the decoding unit 360 and the information recording medium control unit 350 execute the Steps S307 to S313 (Step S314). If judging affirmatively, the UI unit 310 instructs the system control unit 320 to stop the high-speed playback, and the system control unit 320 instructs the decoding unit 360 and the information recording medium control unit 350 to stop the high-speed playback. As a result, the recording/playback apparatus 300 stops the high-speed playback processing. If the UI unit 310 has not received the instruction, the decoding unit 360 and the information recording medium control unit 350 continues the execution of Steps S307 to S313, and the recording/playback apparatus continues the high-speed playback processing.

This concludes the explanation of the high-speed playback processing performed by the recording/playback apparatus 300.

SPECIFIC EXAMPLES

Figure 12:
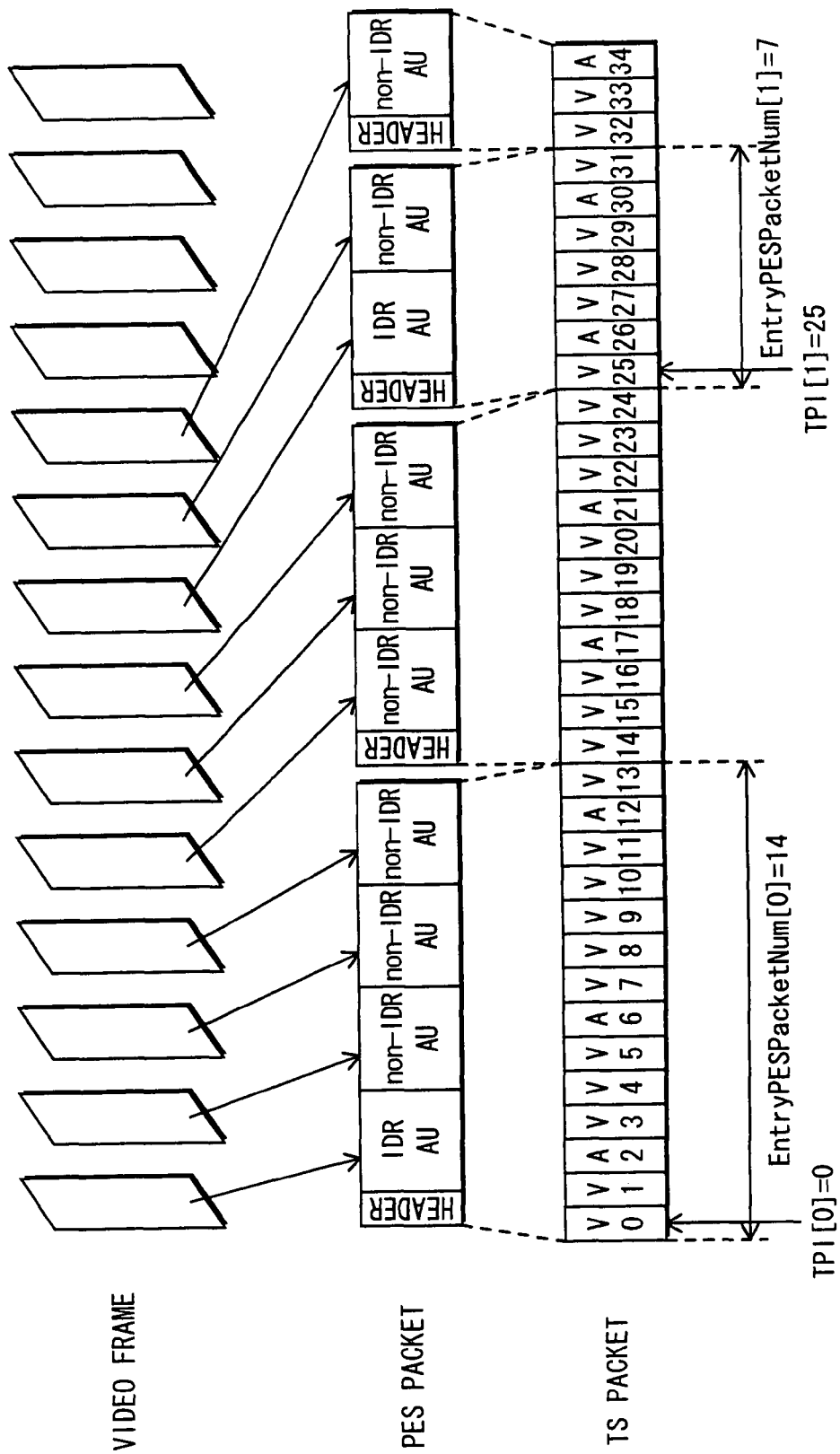
FIG. 12 schematically shows the present invention.

FIG. 12 schematically shows the idea of the present invention. In FIG. 12, the upper chart shows video frames, the middle chart shows PES packets (of only video data), and the lower chart shows TS packets. In the lower chart, "V" represents a TS packet that stores therein video data, and "A" represents a TS packet that stores therein audio data. The numbers 0 to 34 represent numbers given to TS packets respectively. As illustrated in this drawing, a PES packet is structured from a plurality of pictures, and each picture completes in a single PES packet, i.e. each picture is not divided into pieces and not separately stored in different PES packets.

Upon acquiring the TS packet V0 which is located at the head of the content, the TS packet analysis unit 331 judges whether the TS packet V0 includes a PES packet header of video data. Here, as shown in the drawing, the TS packet V0 includes a PES packet header of video data. Accordingly, the TS packet analysis unit 331 further judges whether the PES packet that includes the TS packet V0 includes an IDR picture. Since the PES packet includes an IDR picture as shown in the drawing, the TPI holding unit 332 holds a number 0 that has been given to the TS packet, as the TPI. Also, the TS packet analysis unit 331 sets 1 to the count of the TS packets counted by the TS packet counting unit 333. Next, the TS packet analysis unit 331 acquires the TS packet V1, and judges whether the TS packet V1 includes the PES packet header of video data. Since the TS packet V1 does not include the PES packet header of video data, the TS packet analysis unit 331 increments the count of the TS packets by one, and acquires the next TS packet A2. Such operations are performed until the TS packet V13 is processed.

Next, upon acquiring the TS packet V14, the TS packet analysis unit 331 judges whether the TS packet V14 includes a PES packet header of video data. Here, as shown in the drawing, the TS packet V14 includes a PES packet header of video data. Therefore, the border of PES packets exists between the TS packet V13 and the TS packet V14. Accordingly, the count of the TS packets that has been counted until this moment is set to the EntryPESPacketNum. Then, the meta-information storage unit 334 stores therein the EntryPESPacketNum and the number held in the TPI holding unit in association with each other.

The TS packet analysis unit 331 further judges whether the PES packet that includes the TS packet V14 includes an IDR picture. Since the PES packet does not include the IDR picture as shown in the drawing, the TS packet analysis unit 331 further acquires the TS packet V15, and judges whether the TS packet V15 includes a PES packet header of video data.

Since the TS packet V15 does not include a PES packet header of video data, the TS packet analysis unit 331 further acquires the next TS packet V16. Such operations are performed until the TS packet V24 is processed.

Next, upon receiving the TS packet V25, the TS packet analysis unit 331 judges whether the TS packet V25 includes a PES packet header of video data. Here, as shown in the drawing, the TS packet V25 includes a PES packet header of video data. Accordingly, the TS packet analysis unit 331 further judges whether the PES packet that includes the TS packet V25 includes an IDR picture. Since the PES packet includes an IDR picture as shown in the drawing, the TPI holding unit 332 holds a number 25 that has been given to the TS packet, as the TPI. Also, the TS packet analysis unit 331 sets 1 to the count of the TS packets counted by the TS packet counting unit 333. Next, the TS packet analysis unit 331 acquires the TS packet A 26, and judges whether the TS packet A26 includes a PES packet header of video data. Since the TS packet A26 does not include a PES packet header of video data, the TS packet analysis unit 331 increments the count of the TS packets by 1, and acquires the next TS packet V27. Such operations are performed until the TS packet V31 is processed.

Next, upon receiving the TS packet V32, the TS packet analysis unit 331 judges whether the TS packet V32 includes a PES packet header of video data. Here, as shown in the drawing, the TS packet V32 includes a PES packet header of video data. Therefore, the border of PES packets exists between the TS packet V31 and the TS packet V32. Accordingly, the count of TS packets that has been counted until this moment is set to the EntryPESPacketNum. Then, the meta-information storage unit 334 stores therein the EntryPESPacketNum and the number held in the TPI holding unit in association with each other.

FIG. 13 shows a TSE_INFO5 table generated in the manner described above.

As described above, according to the first embodiment, it is possible to judge whether a TS packet includes a PES packet header of video data and judge whether the PES packet includes an IDR picture with reference to a TS header of the TS packet and the Access Unit delimiter, and it is unnecessary to expand the TS to a PES stream.

Also, the size of the IDR picture can be approximated using the number of TS packets included in the PES packet that has been judged as including the IDR picture. Therefore, although the accuracy of the data size is not very high, the load of processing to be performed by the recording/playback apparatus 300 at the reception is far lower than stationary recording apparatuses such as a DVD recording apparatus.

Second Embodiment

The first embodiment attempts to reduce the processing load by approximating the size of an IDR picture using the number of TS packets included in the PES packet that has been judged as indulging the IDR picture. However, in the case of having received a digital broadcast wave in an area where it is difficult for broadcast waves to penetrate for example, the received stream data may be altered from the transmitted original data. In such a case, it is possible that the recording/playback apparatus can not acquire the TS-packet including the head of the PES packet because of loss of TS packets included in the received stream data, and can not appropriately approximate the size of the IDR picture.

In terms of this problem, the recording/playback apparatus 300 pertaining to the second embodiment performs the approximation using size information of a PES packet, a PTS and a PCR to determine the border between PES packets, instead of detecting the TS packet, including the head of the PES packet.

Firstly, the following describes a method for approximating the size of an IDR picture by using the size information of a PES packet that is judged as including the IDR picture.

In the case of performing the approximation by this method, a TS packet analysis unit 331a has, in addition to the functions shown in the first embodiment, a function of acquiring a PES_packet_length if judging that the PES packet that includes the TS packet includes an IDR picture with reference to the primary_pic_type of the TS packet. Also, after the judgment, the TS packet analysis unit 331a compares the total size of the TS packets with the size of the PES packet at every acquisition of a TS packet to judge whether the total size of the TS packets is equal to or greater than the size of the PES packet. When it is judged that the total size of the TS packets is equal to or greater than the size of the PES packet, the number of TS packets that has been counted is set to the EntryPESPacketNum.

<Meta-Information Generation Processing 2>

Figure 14:
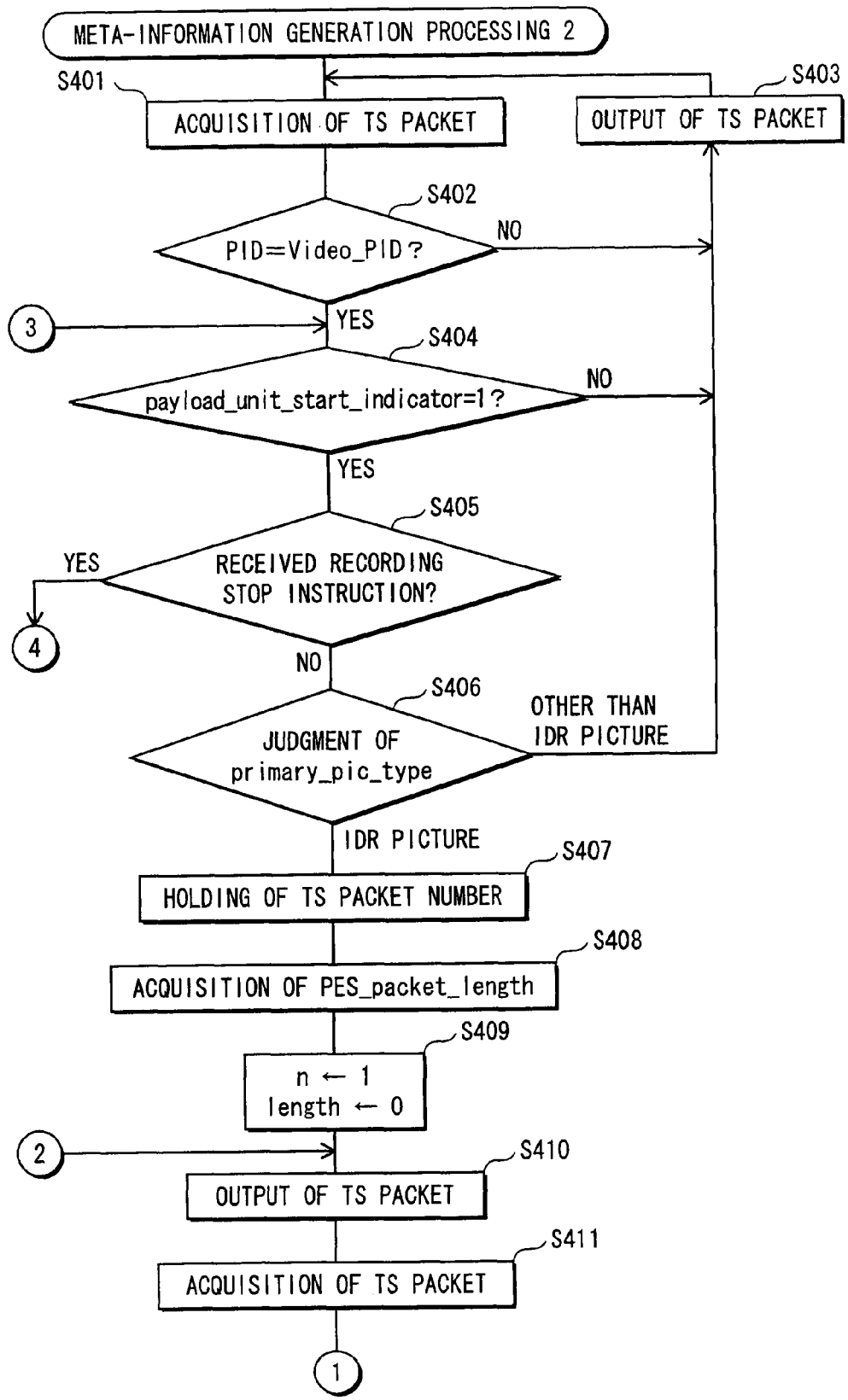
FIG. 14 is a flowchart showing meta-information generation processing 2 of the second embodiment.
Figure 15:
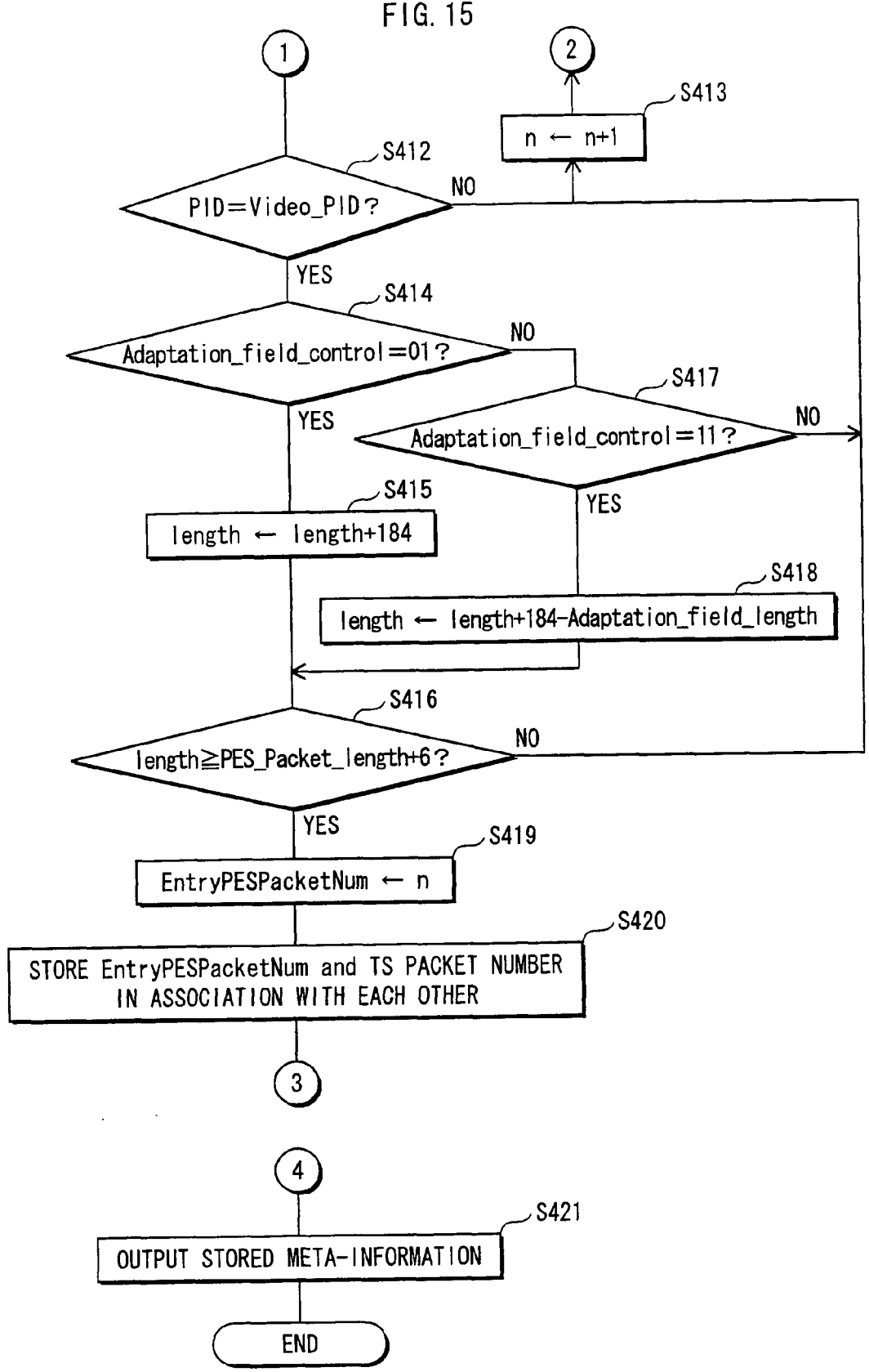
FIG. 15 is a flowchart showing meta-information generation processing 2 of the second embodiment.

Next, meta-information generation processing according to the above-described method is explained with reference to the flowcharts shown in FIG. 14 and FIG. 15.

In the flowcharts, "n" is a variable that specifies the number of TS packets, and "length" is a variable that specifies the total size of the payloads of the acquired TS packets. The processing performed in Steps S401 to S407 is the same as the processing performed in Steps S201 to S206 of FIG. 9.

In other words, the TS packet analysis unit 331a continues acquiring TS packets until the TS packet analysis unit 331a acquires a TS packet including a payload that includes a PES packet header of video (Steps S401 to S404). If it is judged that the meta-information generation control unit 335 has not received the recording stop instruction (NO in Step S405), the TS packet analysis unit 331a continues acquiring TS packets until the TS packet analysis unit 331a acquires a TS packet that is included in a PES packet that includes an IDR picture (Step S406). Upon acquiring a TS packet included in the PES packet that includes an IDR picture, the number of the TS packets is held (Step S407). If it is judged that the meta-information generation control unit 335 has received the recording stop instruction (YES in Step S405), the meta-information generation control unit 335 outputs the meta-information stored in the meta-information storage unit 334 to the information recording medium control unit 350 (Step S421).

Next, when it is judged that an IDR picture is included in a PES packet, the TS packet analysis unit 331a acquires the PES_packet_length from the PES header (Step S408). 1 is set to "n", and 0 is set to the "length" (Step S409). The TS packet analysis unit 331a outputs the TS packet to the information recording medium control unit 350 (Step S410), and acquires a TS packet from the input unit 340 (Step S411). The TS packet analysis unit 331a refers to the PID of the acquired TS packet, and judges whether the payload includes video data (Step S412). If it is judged that the payload does not include video data, n is incremented by 1 (Step S413), and Step S410 is performed. If it is judged that the payload includes video data, the TS packet analysis unit 331a judges whether the Adaptation_field_control is 1 or not (Step S414). If it is judged that the Adaptaiton_field_control is 01, "length" +184 is set as a new "length" (Step S415). Then, whether the "length" is greater than the PES_packet_length +6 or not is judged (Step S416). If it is judged affirmatively, n is set to the EntryPESPacketNum (Step S419). Then, the meta-information storage unit 334 stores meta-information in which the number of TS packets (TPI) held by the TPI holding unit 332 and the EntryPESPacketNum are associated with each other (Step S420), and then Step S404 is performed. If it is judges negatively, Step S413 is performed. If it is judged that the Adaptaiton_field_control is not 01, whether the Adapation_field_control is 11 or not (Step S417) is judged. If it is judged that the Adaptation_field_control is 11, "length" +184 −Adaptation_field_length is set as anew "length" (Step S418). Then, Step S416 is performed.

This concludes the explanation of the meta-information generation processing 2.

Next, the following describes a method for approximating the size of an IDR picture by using a PTS and a PCR (Program Clock Reference) of the PES packet judged as including the IDR picture.

In the case of performing the approximation by this method, a TS packet analysis unit 331b has, in addition to the functions shown in the first embodiment, a function of acquiring a PTS if judging that the PES packet that includes the TS packet includes an IDR picture with reference to the primary_pic_type of the TS packet. Also, after the judgment, the TS packet analysis unit 331b judges, at every acquisition of a TS packet, whether the TS packet includes the Adaptation_field. If judging affirmatively, the TS packet analysis unit 331b acquires the PCR from the TS packet. Furthermore, the TS packet analysis unit 331b compares the acquired PTS and PCR to judge whether the PCR is equal to or greater than the PTS. If the PCR is equal to or greater than the PTS, the number of TS packets that has been counted is set to EnrtyPESPacketNum.

The PCR is reference clock information used for synchronization of video data and audio data. The PCR is included in the Adaptation_field.

<Meta-Information Generation Processing 3>

Figure 16:
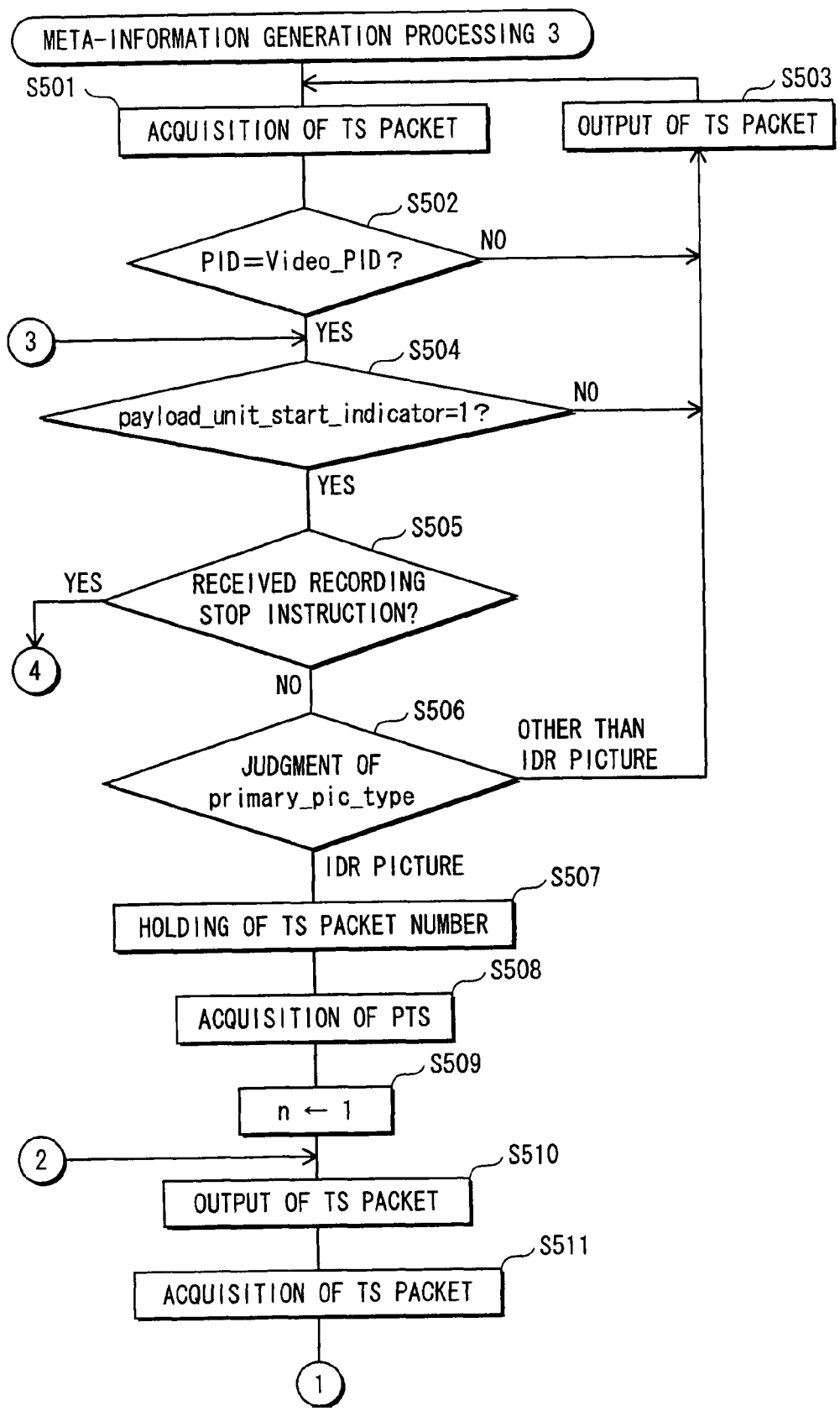
FIG. 16 is a flowchart showing meta-information generation processing 3 of the second embodiment.
Figure 17:
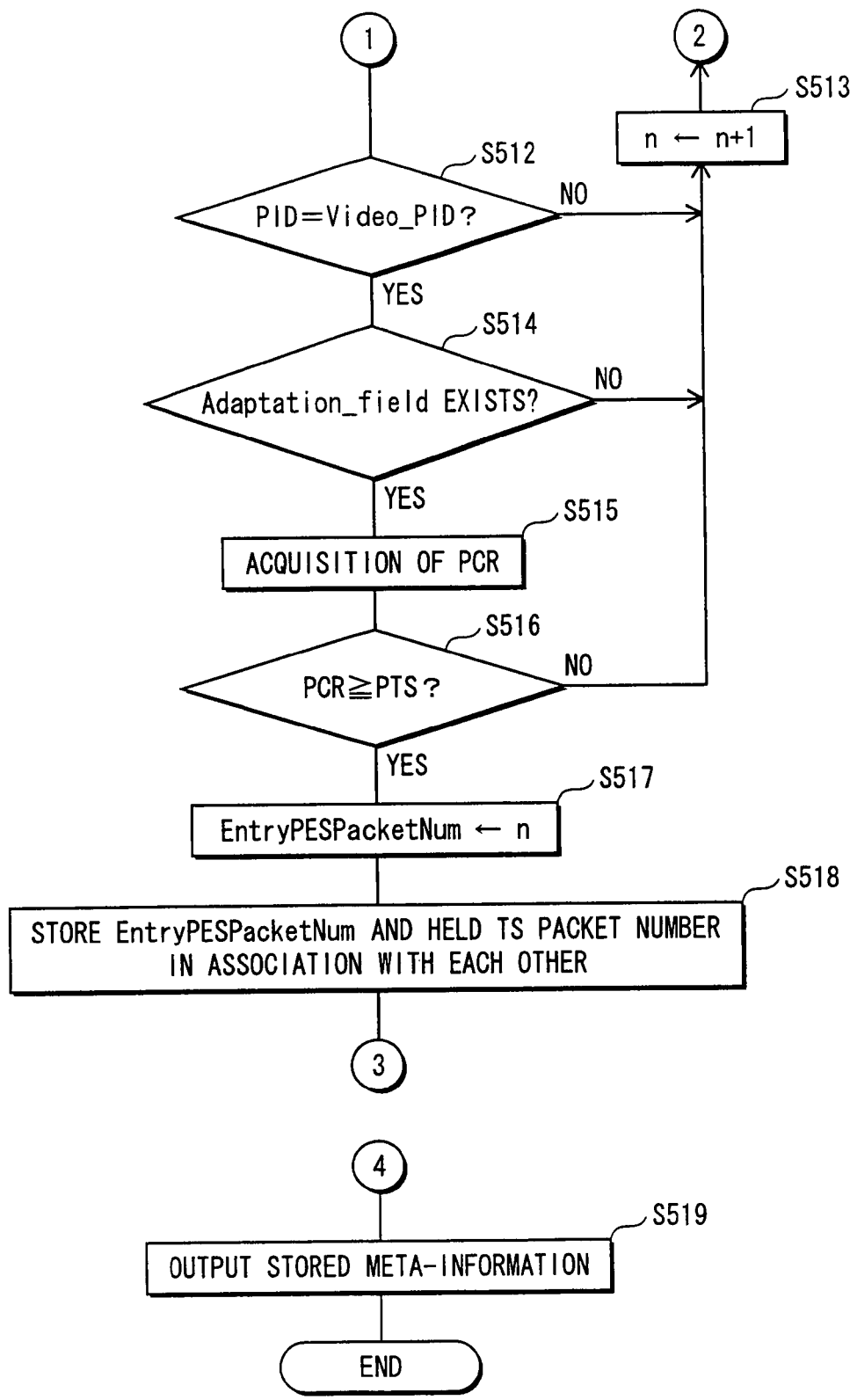
FIG. 17 is a flowchart showing meta-information generation processing 3 of the second embodiment.

Next, meta-information generation processing according to the above-described method is explained with reference to the flowcharts shown in FIG. 16 and FIG. 17.

In the flowcharts, "n" is a variable that specifies the number of TS packets. The processing performed in Steps S501 to S507 is the same as the processing performed in Steps S201 to S206 of FIG. 9. In other words, the TS packet analysis unit 331b continues acquiring TS packets until the TS packet analysis unit 331b acquires a TS packet including a payload that includes a PES packet header of video (Steps S501 to S504). If it is judged that the meta-information generation control unit 335 has not received the recording stop instruction (NO in Step S505), the TS packet analysis unit 331b continues acquiring TS packets until the TS packet analysis unit 331b acquires a TS packet that is included in a PES packet that includes an IDR picture (Step S506). Upon acquiring a TS packet included in the PES packet that includes an IDR picture, the number of the TS packets is held (Step S507). If it is judged that the meta-information generation control unit 335 has received the recording stop instruction (YES in Step S505), the meta-information generation control unit 335 outputs the meta-information stored in the meta-information storage unit 334 to the information recording medium control unit 350 (Step S519).

Next, when it is judged that an IDR picture is included in a PES packet, the TS packet analysis unit 331b acquires the PTS from the PES header (Step S508). 1 is set to "n" (Step S509). The TS packet analysis unit 331b outputs the TS packet to the information recording medium control unit 350 (Step S510), and acquires a TS packet from the input unit 340 (Step S511). The TS packet analysis unit 331b refers to the PID of the acquired TS packet, and judges whether the payload includes video data (Step S512). If it is judged that the payload does not include video data, n is incremented by 1 (Step S513), and Step S510 is performed. If it is judged that the payload includes video data, the TS packet analysis unit 331b judges whether the Adaptation_field exists or not (Step S514). If it is judged that the Adaptation_field does not exist, Step S513 is performed. If it is judged that the Adaptation_field exists, the PCR included in the TS packet is acquired (Step S515). It is judged whether the acquired PCR is equal to or greater than the PTS (Step S516). If the PCR is equal to or greater than the PTS, n is set to the EntryPESPacketNum (Step S517). The meta-information storage unit 334 stores the EntryPESPacketNum and the number (TPI) held in the TPI holding unit 332 in association with each other (Step S518). If the PCR is smaller than the PTS, Step S513 is performed.

This concludes the explanation of the meta-information generation processing 3.

Finally, a method for approximating the size of an IDR picture by using a PTS of a PES packet that is judged as including the IDR picture and a PTS of a PES header of following video data or audio data.

When acquiring a TS packet constituting the PES packet that includes an IDR picture, a TS packet analysis unit 331c acquires the PTS of the PES packet. The TS packet analysis unit 331c acquires the PTS of each PES header included in the following video data and audio data.

The PTS of video data is, at least, a PTS of a picture that follows the IDR picture. Therefore, it is able to judge from the acquisition of the PTS of video data that at least a TS packet constituting a PES packet that includes the IDR picture has been acquired.

Upon receiving a PTS of audio data, the TS packet analysis unit 331c compares it with a PTS of the IDR picture. In view of the decode model and the audio frame size defined in the ISO/IEC 13818-1 standard, a tolerable difference between the PTS of the audio data and the PTS of the video data can be calculated. If the PTS of the acquired audio data is more than the tolerable value, it is highly possible that the TS packet analysis unit 331c has failed to acquire a PTS of video data. Therefore, it is possible to judge that at least an IDR picture has been acquired.

As described above, according to the second-embodiment, it is possible to appropriately approximate the size of the IDR picture even in the case of having received a digital broadcast wave in an area where it is difficult for broadcast waves to penetrate for example, and the received stream data has been altered from the transmitted original data.

Supplementary Explanations

Although the high-speed playback processing is described in the embodiments, particular playback such as thumbnail display and so on may be applied.

In the above-described embodiments, the decoding unit 360 decodes only IDR pictures included in the PES packets. However, the decoding unit 360 may decodes not only IDR picture but all the pictures included in the PES packets, and output the decoded pictures to the output unit 370.

In the above-describe embodiments, the TS packet analysis unit 331 judges whether a TS packet includes an IDR picture. However, the TS packet analysis unit 331 may judge whether-or not a TS packet includes either of an IDR picture or a non-IDR I picture. Here, pictures following the non-IDR I picture might refer to pictures preceding the non-IDR I picture. There are two types of I pictures. One is IDR pictures, and the other is Non-IDR I pictures.

In the above-described embodiments, the size of the PES packet including an IDR picture is represented with the number of TS packets. However, the size may be represented with the number of bytes or the like.

In the above-described embodiment, the recording/playback apparatus 300 is explained. However, the present invention may be any of the method including the Steps shown in the flowcharts, a computer-readable recording medium and an integrated circuit sicu as a system LSI. The system LSI may be variously described as IC, LSI, super LSI or ultra LSI depending on the level of integration.

Also, the technique used to make an integrated circuit does not have to be LSI. A special-purpose circuit or general-purpose processor may be used instead. LSI circuits whose configurations can be altered after production such as the programmable FPGA (Field Programmable Gate Array) or a reconfigurable processor whose circuit cell connections and settings are configurable may also be used.

Moreover, if, due to progress in the field of semiconductor technology or the derivation of another technology, a technology to replace LSI emerges, that technology may, as a matter of course, be used to integrate the functional block. The use of biotechnology, and the like is considered to be a possibility.

Industrial Applicability

The recording/playback apparatus 300 of the present invention can be used for business purposes i.e., can be used repeatedly and continuously, in the manufacturing industry. In particular, the recording/playback apparatus 300 is useful as a portable apparatus that supports the one-segment broadcasting.

The invention claimed is:

1. A recording apparatus generating meta-information including an initial address of a plurality of TS packets constituting a PES packet that includes an independently-decodable picture, and including size information pertaining to the independently-decodable picture, and recording the generated meta-information onto a recording medium, the recording apparatus comprising:
 a header judgment unit operable to sequentially judge whether each respective TS packet of the plurality of TS packets includes a PES packet header, based on header information of the respective TS packet of the plurality of TS packets;
 a picture judging unit operable to, when the header judgment unit judges that a TS packet of the plurality of TS packets includes the PES packet header, judge whether the PES packet includes a head picture that is independently decodable, the judgment being performed by the picture judging unit using information included in the TS packet including the PES packet header, and the information included in the TS packet including the PES packet header indicating whether the head picture of the PES packet is independently decodable;
 a counting unit operable to start a counting of TS packets of the plurality of TS packets when the picture judging unit judges affirmatively, and operable to stop the counting of the TS packets of the plurality of TS packets when the header judgment unit subsequently judges affirmatively, so as to obtain a TS packet count; and
 a generation unit operable to generate the size information using the TS packet count obtained by the counting unit.

2. A non-transitory computer-readable recording medium having a computer program recorded thereon, the computer program causing a computer to (i) generate meta-information including an initial address of a plurality of TS packets constituting a PES packet that includes an independently-decodable picture, and including size information pertaining to the independently-decodable picture, and (ii) record the generated meta-information onto a recording medium, and the computer program causing the computer to execute a method comprising:
 a header judgment step of sequentially judging whether each respective TS packet of the plurality of TS packets includes a PES packet header, based on header information of the respective TS packet of the plurality of TS packets;
 a picture judging step of, when said header judgment step judges that a TS packet of the plurality of TS packets includes the PES packet header, judging whether the PES packet includes a head picture that is independently decodable, the judgment being performed by said picture judging step using information included in the TS packet including the PES packet header, and the information included in the TS packet including the PES packet header indicating whether the head picture of the PES packet is independently decodable;
 a counting step of starting a counting of TS packets of the plurality of TS packets when said picture judging step judges that the PES packet includes the head picture that is independently decodable, and of stopping the counting of the TS packets of the plurality of TS packets when said header judgment step subsequently judges that any TS packet of the plurality of TS packets includes the PES packet header, so as to obtain a TS packet count; and
 a generation step of generating the size information using the TS packet count obtained by said counting step.

3. A recording method for generating meta-information including an initial address of a plurality of TS packets constituting a PES packet that includes an independently-decodable picture, and including size information pertaining to the independently-decodable picture, and for recording the generated meta-information onto a recording medium, the recording method comprising:
 a header judgment step of sequentially judging whether each respective TS packet of the plurality of TS packets includes a PES packet header, based on header information of the respective TS packet of the plurality of TS packets;
 a picture judging step of, when said header judgment step judges that a TS packet of the plurality of TS packets includes the PES packet header, judging whether the PES packet includes a head picture that is independently decodable, the judgment being performed by said picture judging step using information included in the TS packet including the PES packet header, and the information included in the TS packet including the PES packet header indicating whether the head picture of the PES packet is independently decodable;
 a counting step of starting a counting of TS packets of the plurality of TS packets when said picture judging step judges affirmatively, and of stopping the counting of the TS packets of the plurality of TS packets when said header judgment step subsequently judges affirmatively, so as to obtain a TS packet count; and
 a generation step of generating the size information using the TS packet count obtained by said counting step.

4. A system LSI circuit mounted on a recording apparatus generating meta-information including an initial address of a plurality of TS packets constituting a PES packet that includes an independently-decodable picture, and including size information pertaining to the independently-decodable picture, and recording the generated meta-information onto a recording medium, the recording apparatus comprising:
 a header judgment unit operable to sequentially judge whether each respective TS packet of the plurality of TS packets includes a PES packet header, based on header information of the respective TS packet of the plurality of TS packets;

a picture judging unit operable to, when the header judgment unit judges that a TS packet of the plurality of TS packets includes the PES packet header, judge whether the PES packet includes a head picture that is independently decodable, the judgment being performed by the picture judging unit using information included in the TS packet including the PES packet header, and the information included in the TS packet including the PES packet header indicating whether the head picture of the PES packet is independently decodable;

a counting unit operable to start a counting of TS packets of the plurality of TS packets when the picture judging unit judges affirmatively, and operable to stop the counting of the TS packets of the plurality of TS packets when the header judgment unit subsequently judges affirmatively, so as to obtain a TS packet count; and a generation unit operable to generate the size information using the TS packet count obtained by the counting unit.

* * * * *